A. HOLSTEIN.
SNAP FASTENER.
APPLICATION FILED MAR. 23, 1916.

1,272,806.

Patented July 16, 1918.

WITNESS
F. J. Hartman

INVENTOR
Alexander Holstein.
BY
ATTORNEYS

UNITED STATES PATENT OFFICE.

ALEXANDER HOLSTEIN, OF PHILADELPHIA, PENNSYLVANIA.

SNAP-FASTENER.

1,272,806.  Specification of Letters Patent.  Patented July 16, 1918.

Application filed March 23, 1916. Serial No. 86,039.

*To all whom it may concern:*

Be it known that I, ALEXANDER HOLSTEIN, a citizen of the United States, and a resident of the city of Philadelphia, county of Philadelphia, and State of Pennsylvania, have invented certain new and useful Improvements in Snap-Fasteners, of which the following is a specification, reference being had to the accompanying drawing.

Among the principal objects of my invention are to provide a snap fastener for use in connection with articles of wearing apparel or the like which will be of simple construction and which may be manufactured at a low cost; which will be adapted to retain the stud member firmly within the socket member to securely unite the various parts of the fabric or other material in connection with which the fastener may be used; and which shall permit of the ready separation of the members comprising the fastener when it is desired to separate the plies of fabric to which they may be attached.

Further objects of my invention are to provide a snap fastener having the foregoing characteristics which may be readily sewed to the fabric by machinery, thus materially lessening the cost of the garment in connection with which the fastener may be utilized.

Still further objects of my invention are to provide a snap fastener which shall not be liable to get out of order or be damaged when in use; which shall be smooth and symmetrical in contour, and which will present no sharp corners or projections which might catch into or tear any portion of a garment or the like in connection with which the fastener may be used.

My invention further includes all of the other various objects and novel features of construction and arrangement hereinafter more definitely specified and described.

Figure 1:
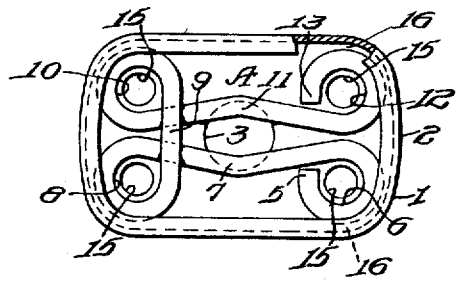
Figure 2:
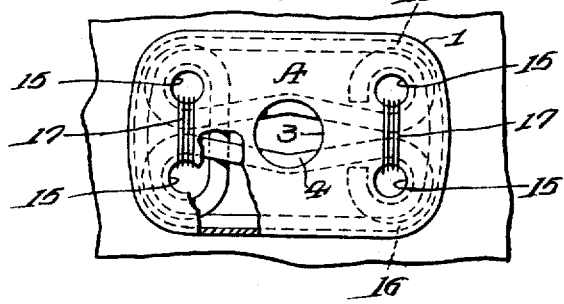
Figure 3:
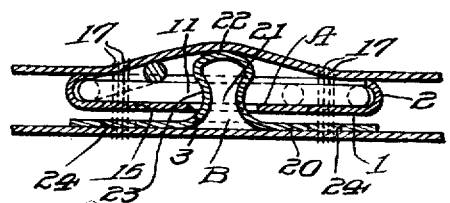
Figure 4:
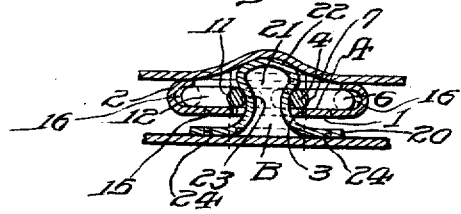

In the accompanying drawing, Figure 1 is an enlarged inverted plan view of the socket member of the fastener with portions broken away for the sake of clearness; Fig. 2 a top plan view thereof showing the socket member attached to a piece of fabric; Fig. 3 a central vertical longitudinal section through both members of the fastener showing the same in operative relation and respectively attached to pieces of fabric; Fig. 4 a central vertical transverse section similar to Fig. 3.

The preferred embodiment of my invention illustrated in the drawing comprises a socket member A and a stud member B, respectively adapted for attachment to separate plies of fabric and operative to unite the same when desired. The socket member may comprise a suitable preferably substantially oblong plate 1 formed of sheet metal or the like and having its peripheral edge curved upwardly and inwardly to form a rim 2, a central, preferably circular, aperture 3 of sufficient size to readily permit the passage of the stud on the stud member of the fastener being centrally disposed in the plate.

On the plate 1, maintained in position thereon by the curved rim 2, is a spring or gripping member 4 of peculiar construction, and preferably formed entirely of a single piece of suitable spring wire. In forming the spring member, beginning at the point 5 the wire is carried around in a substantially circular form to define an eye 6 and thence directed substantially longitudinally and bowed slightly outwardly as at 7, again bent in a substantial circle to form an eye 8, carried transversely across and preferably above the longitudinal portion 7 as at 9 and again bent in a substantial circle to form an eye 10. The wire is thence carried beneath portion 9 substantially longitudinally opposite the portion 7 and outwardly bowed to correspond thereto as at 11, turned outwardly opposite the eye 7 to form a similar eye 12 and terminated at 13, so that the two ends 5 and 13 will lie respectively closely adjacent the longitudinally extending parts 7 and 11, with all portions of the wire lying preferably substantially in a single plane except the transversely extending portion 9 between the eyes 8 and 10.

The spring or gripping member is preferably formed of such size that while portions of those parts of the wire defining the several eyes will engage beneath the overhanging edge of the rim 2 to maintain the member adjacent the plate when assembled therewith, a slight clearance 16 will normally be left between the exterior of those parts of the member most nearly adjacent the interior of the rim and the rim itself to permit a limited lateral movement to take place between the longitudinally extending parts 7 and 11 of the member when required, and, as hitherto stated, these parts of the wire are preferably bowed slightly outwardly, whereby, as best shown in Fig. 2, a space is formed between them somewhat less in width than the diameter of the aperture 3 in the plate so that the wires will normally project slightly over the margin of the aperture at diametrically opposed points.

The plate is provided with a plurality of other apertures 15 positioned therein to register with the various eyes defined by the bent wire to enable the fastener to be stitched to a piece of fabric or the like by means of transversely extending stitches 17 which are preferably passed through the apertures 15 and the corresponding eyes to cross the wire adjacent the ends of the substantially longitudinally extending portions thereof.

The stud member of the fastener may comprise a plate 20 having an integral outwardly extending stud 21 formed centrally thereof, the head 22 of the stud being of somewhat greater diameter than the neck 23 but not sufficiently great to prevent its passing through the aperture 3 in the plate, and the plate may be provided with suitable orifices 24 for the reception of stitches whereby the plate may be secured to the fabric in the usual manner.

In use the socket member is preferably attached to the fabric in the position shown in Fig. 2, that is, with the curved edge 2 adjacent the fabric, in which position only the surface of the plate 1 and the portions of the wires projecting over the margin of the aperture 3 are visible, and the stud member having been secured to another piece of fabric in the usual manner, the head of the latter may be readily pushed through the aperture 3, the longitudinally extending parts of the wire covered by the plate springing apart for the distance permitted by the clearances 16 to permit the passage of the head and contracting after the head has passed to firmly grip the neck portion 23 of the stud to unite the two members of the fastener and their adjacent plies of fabric together, from which position the members may be separated by pulling them apart with sufficient force to again cause the wires to spring apart to permit the passage of the head.

It will be evident that in the assembled socket member, the gripping member will be securely retained in operative relation with the plate and that the lateral movement of the parts of the gripping member will be limited to the amount permitted by the clearances 16, and as this distance is just sufficient, when supplemented by the inherent resiliency or "give" of the wire to permit the passage of the head of the stud, the parts of the gripping member can never be forced apart beyond their elastic limit, so that even after long continued usage the fasteners will operate as satisfactorily as when new. Furthermore, in such a construction the longitudinally extending parts of the wire may, if desired, be disposed considerably closer together to exert a correspondingly strong grip upon the neck and head of the stud member when in position in the socket, than would be otherwise possible, thereby materially enhancing the holding power of the socket upon the head. It will further be evident that when in position upon the fabric as shown in Fig. 2 the socket member will present a smooth surface, without projections or sharp edges or corners, and that owing to the position and arrangement of the apertures 15 and corresponding eyes in the gripping member, the socket member may readily be attached to the fabric by a suitable sewing machine.

While I have herein illustrated and described a preferred embodiment of my invention with considerable particularity, I do not desire or intend to thereby limit myself specifically thereto, as it will be evident that suitable changes and modifications may be made both in the construction and arrangement of the various parts thereof without departing from the spirit and scope of the invention as defined in the appended claims.

Having thus described my invention, I claim and desire to protect by Letters Patent of the United States:

1. A snap fastener comprising a substantially oblong plate having a central aperture, a plurality of other apertures disposed symmetrically with respect thereto, and a marginal, upwardly curved rim, and a gripping member composed of a single piece of wire bent to define a plurality of eyes arranged to register with said last mentioned apertures and to present a pair of substantially longitudinally extending bowed wires projecting over the margin of said first mentioned aperture, those portions of the wire defining the eyes engaging beneath said rim to position said gripping member on said plate and prevent the permanent lateral displacement of said longitudinally extending wires.

2. A snap fastener comprising a socket member and a stud member, said socket member having a substantially flat body and an upwardly curved marginal rim, a central aperture, a plurality of other symmetrically disposed apertures, a gripping member disposed within said rim and formed of a single piece of wire bent to define a plurality of eyes arranged to register with said last mentioned apertures and to present a pair of opposed substantially longitudinally extending bowed wires projecting beyond the marginal edge of said central aperture, and said stud member comprising a plate having an upwardly extending stud of varying diameter operative to enter said central aperture in said socket member and extend between said longitudinally extending wires of said gripping member.

In witness whereof, I have hereunto set my hand this 22nd day of March, A. D. 1916.

ALEXANDER HOLSTEIN.

Copies of this patent may be obtained for five cents each, by addressing the "Commissioner of Patents, Washington, D. C."